March 31, 1970  O. W. OERMAN  3,503,455
OVERLOAD TRIP DEVICE

Filed July 11, 1967  2 Sheets-Sheet 1

INVENTOR.
OREY W. OERMAN
BY
ATTORNEY

March 31, 1970     O. W. OERMAN     3,503,455

OVERLOAD TRIP DEVICE

Filed July 11, 1967     2 Sheets-Sheet 2

INVENTOR.
OREY W. OERMAN

BY

ATTORNEY

United States Patent Office 3,503,455
Patented Mar. 31, 1970

3,503,455
OVERLOAD TRIP DEVICE
Orey William Oerman, Moline, Ill., assignor to Deere & Company, Moline, Ill., a corporation of Delaware
Filed July 11, 1967, Ser. No. 652,503
Int. Cl. A01b *61/00*
U.S. Cl. 172—271      7 Claims

ABSTRACT OF THE DISCLOSURE

An overlood trip device for a plow standard secured to a plow frame by a pivoted intermediate link, said device interconnecting the standard to the frame by structure which will shear when overload conditions are encountered.

FIELD OF THE INVENTION

The present invention relates generally to overload trip devices for ground working equipment and more particularly to a novel shear bolt standard for a plow bottom.

DESCRIPTION OF THE PRIOR ART

In prior art shear pin standards, the standards have been pivotally secured to the plow frame to move about a single pivot. It has been found, however, that this design is not satisfactory since different conditions require different locations of the pivot. Thus, if the point of the plow share should encounter a sloping rock over which the point could slide, it is best to have the pivot directly above or even slightly forward of the point so that the plow share does not swing down when tripped. If the pivot point were to the rear of the point, the plow would swing down when tripped, lifting the frame and placing undue stress and strain upon the share. However, if the plow share should encounter an overhanging obstruction such as a tree root, it is best to have the pivot point to the rear of the forward point of the plow share so that the share can swing downwardly and unhook. Therefore, it is desirable to have a construction in which the forward point of the plow share can move either rearwardly and upwardly or rearwardly and downwardly.

SUMMARY OF THE INVENTION

It is an object of the present invention to provide a shear pin construction in which the forward point of the plow share can move either rearwardly and downwardly or rearwardly and upwardly when an obstruction is encountered.

More particularly, it is an object of the present invention to provide an overload trip device in which a plow bottom is secured to a standard that is in turn interconnected with the main frame of a plow by a link pivoted at one end to the frame and at the other end to the standard, there being additional means normally holding the standard in its lower forward position but permitting rearward movement upon shearing of the additional means.

A further object of the invention is to provide a mounting construction for a plow bottom in which the plow bottom assembly is secured to the frame for pivoting movement about one or both of two pivots, the bottom being held in its lower forward working position by a link secured at its ends to the frame and to the standard, the link having either internal means which can shear or means by which it is connected to one of the frame or standard which can shear upon overload additions to permit the plow bottom to swing rearwardly about two pivot points when an obstruction is encountered.

These and other objects and advantages of this invention will be apparent to those skilled in the art after a consideration of the following detailed description, taken in conjunction with the accompanying drawings in which the preferred form of this invention is illustrated.

DESCRIPTION OF THE PREFERRED EMBODIMENTS

Figures 1, 2, 3:
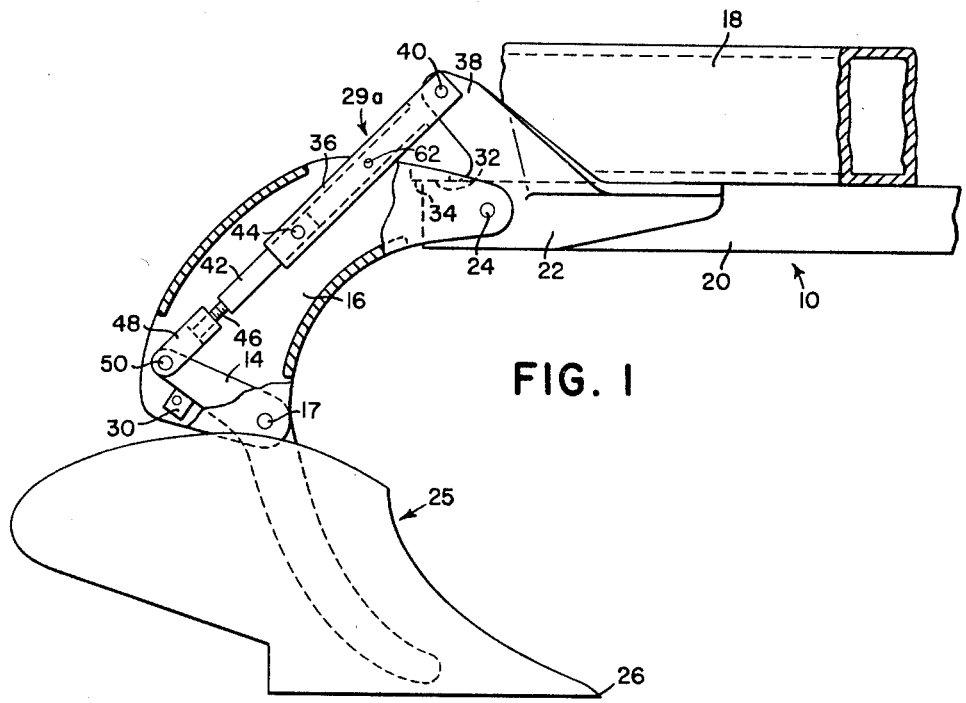
FIGS. 1, 2 and 3 show one embodiment of applicant's novel overload trip device, FIG. 1 illustrating the means by which a plow bottom is secured to a plow frame, FIG. 2 being a detail view of the shear link, and FIG. 3 being an end view of the shear link, and FIG. 3 being an end an end view of the shear link.
Figure 4:
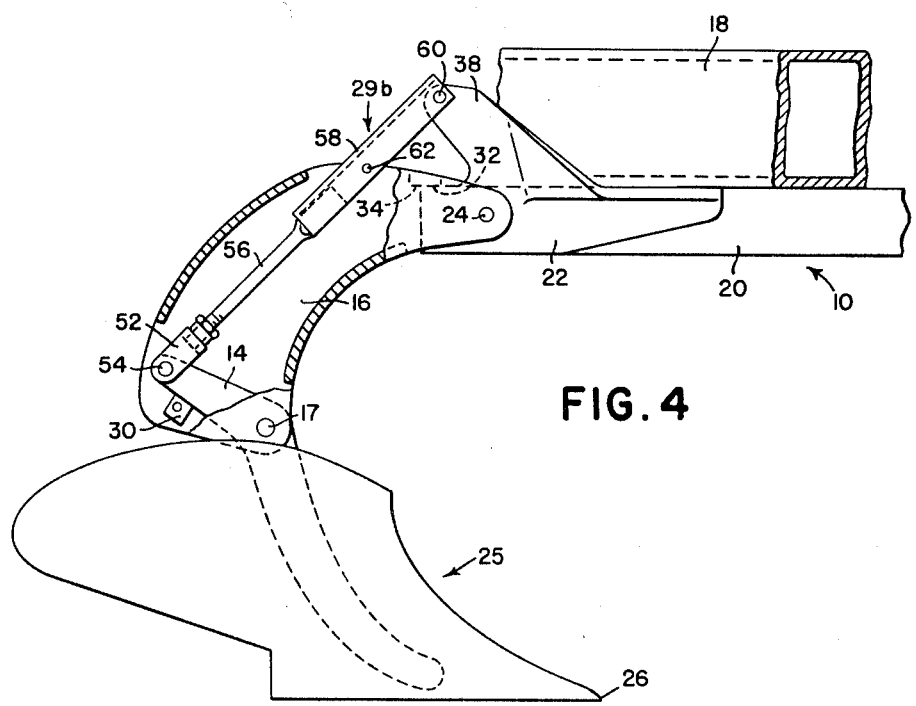
FIG. 4 is a view of a second embodiment of applicant's invention, this view being somewhat similar to FIG. 1.

Referring first to FIGS. 1 and 4, a plow frame, indicated generally at 10, is interconnected with a standard 14 by an intermediate link 16. The link 16 is pivotally secured at one end to frame 10 and at the other end to the standard 14 about pivot bolt 17. The plow frame includes a main obliquely extending box frame member 18 and longitudinally extending sub-frame members 20 which are rigidly secured to the member 18. The rear ends of the sub-frame members 20 are provided with attaching brackets 22. The link 16 is pivotally secured to the attaching bracket 22 by means of a pivot bolt 24.

Mounted on each standard 14 is plow bottom 25, which includes a moldboard, landside, a share terminating in a forward point 26, and a frog which interconnects the various members with the standard 14.

A holding or shear link, indicated generally at 29a holds the plow bottom 25 in its normal working position with an upper portion of the standard 14 contacting an adjustable stop 30 carried by the link 16. An upper portion of the link 16 contacts a stop surface 32 formed on the upper rear portion of the sub-frame member 20 by means of a transverse strap 34. The adjustable stop 30 is provided to adjust the attitude of the standard 16, resulting in adding or decreasing the amount of suction in the plow bottom 25.

Now referring more particularly to FIG. 1 the holding means 29a is formed of two telescopically movable first and second members, the first member being formed of a square tube 36 which is pivotally interconnected with an upstanding abutment 38 on the mounting bracket 22 by means of a pivot bolt 40. The second member is formed of a square shaft 42 which is telescopically receivable within the square tube 36. The square shaft and square tube are provided with alignable apertures through which a shear pin 44 may be passed to interconnect them in their extended position shown in FIG. 1. The second member also includes a threaded shaft 46 which is secured to the square shaft 42, the threaded shaft 46 having threaded on its end an adjustable fork 48.

When plowing, the plow bottom 25 is held in the position illustrated with the shear pin 44 holding the first and second members in their extended position with the standard 14 contacting stop 30 and the link 16 contacting stop 32. Should an obstruction be encountered which cannot readily be plowed out of the way, the pin 44 will shear permitting the square shaft 42 to telescope within the square tube 36. As 42 telescopes within 36, the plow bottom can pivot about either pivot 17 or 24 or both.

As prevously mentioned, an adjustable stop 30 is provided to vary the attitude of the plow bottom 12. Since various settings of the stop 30 will require different length of the holding means 29a, the adjustable feature provided by the threaded shaft 46 and adjustable fork 48 is provided. To adjust the length of the shear link 29a, it is only necessary to rotate the adjustable fork 48 on the threaded shaft 46 the desired number of times and then dispose the ears of fork 48 on either side of the apertured end of the standard 14 and to secure it in place by means of a bolt 50.

A modified form of holding link, indicated generally at 29b, is shown in FIG. 4. In this form, a non-telescoping link is provided having at one end a fork 52 that is secured to the standard 14 by means of a pivot bolt 54. The fork 52 is in turn adjustably secured to a threaded rod 56 in substantially the same manner as the fork 48 is secured to the rod 46. Securely mounted on the upper forward end of the rod 56 is a channel shaped member 58 which is pinned to the upstanding abutment 38 by means of a shear bolt 60.

Should an obstruction be encounterd by the modification shown in FIG. 4, the shear pin 60 will shear permitting the channel shaped member 58 to ride upwardly and forwardly on the abutment 38 as the plow swings rearwardly.

Should it be desired to change plow shares, the plow bottom 25 may be swung up to its tripped position by pulling the pin 60 and reinserting it through aperture 62 when that aperture is in alignment with the aperture end member 38.

When adjusting the shear link for various positions of the stop 30, it has been found that there is some play in the assembly. Thus it is virtually impossible to insert the shear pin 44 or 60 after the link has been adjusted unless there is a small amount of play in the assembly. This play is not desirable in certain circumstances since it will cause undue wear to the assembly.

Figure 5:
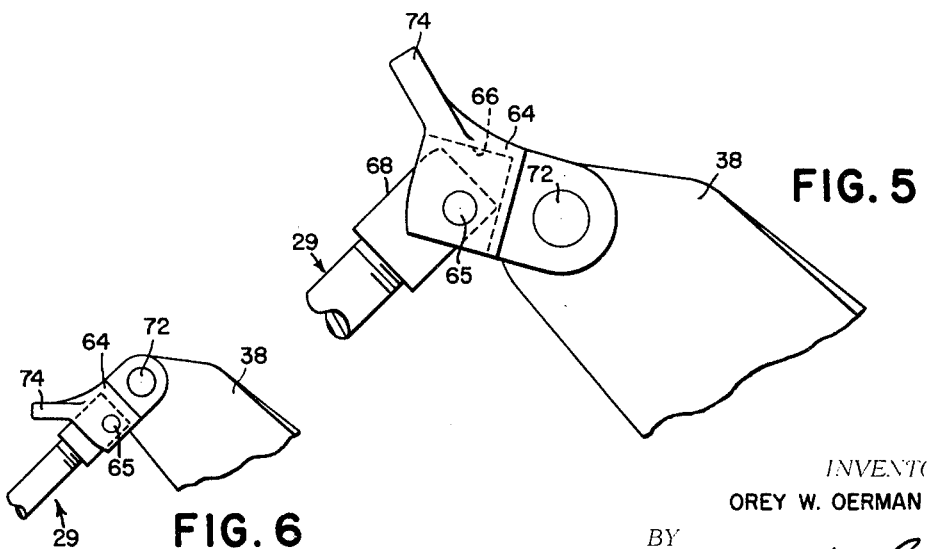
FIGS. 5 and 6 show a toggle link construction whereby the shear link may be interconnected with the plow frame.
Figure 6:
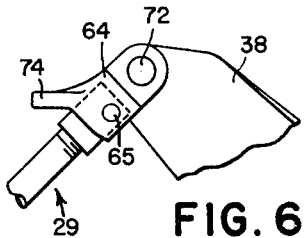

As shown in FIGS. 5 and 6, a toggle link 64 may be used to remove the play. When the toggle link 64 is employed, the link 29 is reversed end for end and a threaded block 68 replaces the fork 48 or 52. The link 64 is pivotally secured to the block 68 by a pivot pin 65. In operation, the link 64 is swung to the position shown in FIG. 5 when adjusting the length of the shear link 29. After the shear link 29 has been adjusted to its desired length, the toggle link 64 is swung from the position shown in FIG. 5 to the position shown in FIG. 6 where the under surface of the block 66 of the toggle link will contact the upper surface 68 on the shear link 29. In this position, if the link 29 has been properly adjusted, there will be no slack in the assembly. As can be seen from FIG. 6, the pivot pin 65 is in an over-centered position when the toggle link has been swung down.

The toggle link 64 is provided with a handle portion 74 to facilitate its movement about its pivotal connection 72 with the abutment 38.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

I claim:

1. An overload trip device for plows and the like comprising: a plow frame, a standard, a plow bottom mounted on said standard, link means pivotally interconnecting said standard with said frame for movement about either one or both of a pair of upper and lower pivots whereby the forward point of the plow share may initially move rearwardly about either or both of said pivots when an obstruction is encountered which cannot readily be plowed out of the way, and a single holding means normally preventing movement about the pivots to hold the plow bottom in its normal ground working position, said holding means including shear structure capable of shearing when an obstruction is encountered to permit the aforesaid rearward movement of the plow bottom about either or both of the pivots.

2. The overload trip device set forth in claim 1 in which said holding means includes a first member interconnected to said plow frame, a second member interconnected to said standard, said first and second members being fixed relative to each other by said shear structure.

3. The overload trip device set forth in claim 2 in which one of said first and second members telescopes within the other of said first and second members upon shearing of said shear structure.

4. The overload trip device set forth in claim 3 in which said first and second members are provided with alignable apertures through which a shear pin is disposed when the plow bottom is in its normal ground working position, said second member having at an end a threaded rod adjustably received within a fork that is in turn secured to said standard.

5. The overload trip device set forth in claim 1 in which adjustable stop means are provided between said standard and said link means whereby the attitude of said standard may be varied when in its normal plowing position between positions of the increased and decreased suction, said holding means being adjustable in length to compensate for the stop setting.

6. The overload trip device set forth in claim 2 in which one of the first and second members is interconnected to the plow frame or standard by a toggle link means which affords adjustment in the length of the holding means for facilitating replacement of the shear structure.

7. The overload trip device set forth in claim 1 in which said holding means includes an elongated channel shaped member having one end operatively connected to the standard and the opposite end slidably disposed over an upstanding abutment on said frame, and the shear structure includes a shear pin extending through aligned apertures in the legs of the channel shaped member and the upstanding abutment.

References Cited

UNITED STATES PATENTS

| 445,871 | 2/1891 | Bailey et al. | 172—271 XR |
| 2,693,368 | 11/1954 | Petron | 280—482 |
| 2,714,498 | 8/1955 | Wüthrich | 284—354 |
| 3,302,728 | 2/1967 | Sullivan et al. | 172—265 |

ROBERT E. PULFREY, Primary Examiner

JAMES W. PETERSON, Assistant Examiner

U.S. Cl. X.R.

74—520